(12) United States Patent
Alonso et al.

(10) Patent No.: US 10,793,343 B1
(45) Date of Patent: Oct. 6, 2020

(54) AEROSOL VALVE

(71) Applicants: Nelson Alonso, Miami, FL (US); Leonardo Alonso, Miami, FL (US)

(72) Inventors: Nelson Alonso, Miami, FL (US); Leonardo Alonso, Miami, FL (US)

( * ) Notice: Subject to any disclaimer, the term of this patent is extended or adjusted under 35 U.S.C. 154(b) by 0 days.

(21) Appl. No.: 16/706,452

(22) Filed: Dec. 6, 2019

Related U.S. Application Data

(63) Continuation-in-part of application No. 16/215,415, filed on Dec. 10, 2018, now Pat. No. 10,351,335, and a continuation-in-part of application No. 16/003,346, filed on Jun. 8, 2018, now Pat. No. 10,329,078.

(51) Int. Cl.
  *B65D 83/48* (2006.01)
  *F16K 3/316* (2006.01)
  *F16K 3/314* (2006.01)
  *F16K 3/24* (2006.01)

(52) U.S. Cl.
  CPC ............. *B65D 83/48* (2013.01); *F16K 3/24* (2013.01); *F16K 3/314* (2013.01); *F16K 3/316* (2013.01)

(58) Field of Classification Search
  CPC ... B65D 83/48; B65D 83/52–546; F16K 3/24; F16K 3/314; F16K 3/316
  See application file for complete search history.

(56) References Cited

U.S. PATENT DOCUMENTS

| | | | | |
|---|---|---|---|---|
| 2,900,114 A | * | 8/1959 | Utz | B65D 83/48 222/402.24 |
| 3,074,601 A | * | 1/1963 | Kuffer | B65D 83/48 222/402.24 |
| 3,130,880 A | * | 4/1964 | Briechle | B65D 83/54 222/402.2 |
| 3,146,922 A | * | 9/1964 | Tuttle, Jr. | B65D 83/48 222/402.12 |
| 3,180,535 A | * | 4/1965 | Ward | G01F 11/04 222/335 |
| 3,180,536 A | * | 4/1965 | Meshberg | B65D 83/22 222/402.11 |
| 3,187,962 A | * | 6/1965 | Meshberg | B65D 83/48 222/402.2 |
| 3,424,353 A | * | 1/1969 | Meador | B65D 83/44 222/402.1 |
| 3,627,179 A | * | 12/1971 | Scheindel | B65D 83/48 222/402.21 |
| 3,806,005 A | * | 4/1974 | Prussin | B65D 83/48 222/402.16 |
| 3,858,771 A | * | 1/1975 | Bret | F16K 1/301 222/402.2 |
| 3,861,570 A | * | 1/1975 | Green | B65D 83/48 222/402.17 |

(Continued)

*Primary Examiner* — Paul R Durand
*Assistant Examiner* — Randall A Gruby
(74) *Attorney, Agent, or Firm* — Christopher J. Van Dam, PA; Chris Vandam

(57) ABSTRACT

An aerosol valve having a cap with integral tube passing into a lid of an aerosol can. The bottom of the lid has a valve body containing a gate and a spring. The interior of the valve body has tapered grooves that are narrower on an upper end to control the flow. The spring biases the face of the edge against the washer to close the valve. When the cap is pressed the tube presses the top of the gate to separate the edge and the washer thereby opening the valve and causing the contents of the aerosol can to be dispensed.

3 Claims, 8 Drawing Sheets

(56) References Cited

U.S. PATENT DOCUMENTS

| | | | | |
|---|---|---|---|---|
| 3,893,653 | A * | 7/1975 | Kolanus | B65D 83/48 |
| | | | | 251/353 |
| 3,915,390 | A * | 10/1975 | Green | B65D 83/48 |
| | | | | 239/573 |
| 3,977,576 | A * | 8/1976 | Amabili | B65D 83/48 |
| | | | | 222/402.1 |
| 4,702,400 | A * | 10/1987 | Corbett | G01F 11/32 |
| | | | | 222/402.2 |
| 5,326,002 | A * | 7/1994 | Dubini | B65D 83/48 |
| | | | | 222/402.1 |
| 5,915,598 | A * | 6/1999 | Yazawa | B65D 83/44 |
| | | | | 222/402.1 |
| 8,152,030 | B2 * | 4/2012 | Coroneos | B65D 83/207 |
| | | | | 137/322 |
| 10,399,767 | B2 * | 9/2019 | Plaschkes | B65D 83/42 |
| 10,532,881 | B2 * | 1/2020 | Bodet | B65D 83/38 |
| 10,661,291 | B2 * | 5/2020 | Schmid | B65D 83/546 |
| 10,723,543 | B2 * | 7/2020 | Plaschkes | B65D 83/546 |
| 2005/0121476 | A1 * | 6/2005 | Pauls | B65D 83/48 |
| | | | | 222/402.24 |
| 2011/0017780 | A1 * | 1/2011 | Coroneos | B65D 83/207 |
| | | | | 222/402.1 |
| 2017/0008692 | A1 * | 1/2017 | Davideit | B65D 83/54 |

\* cited by examiner

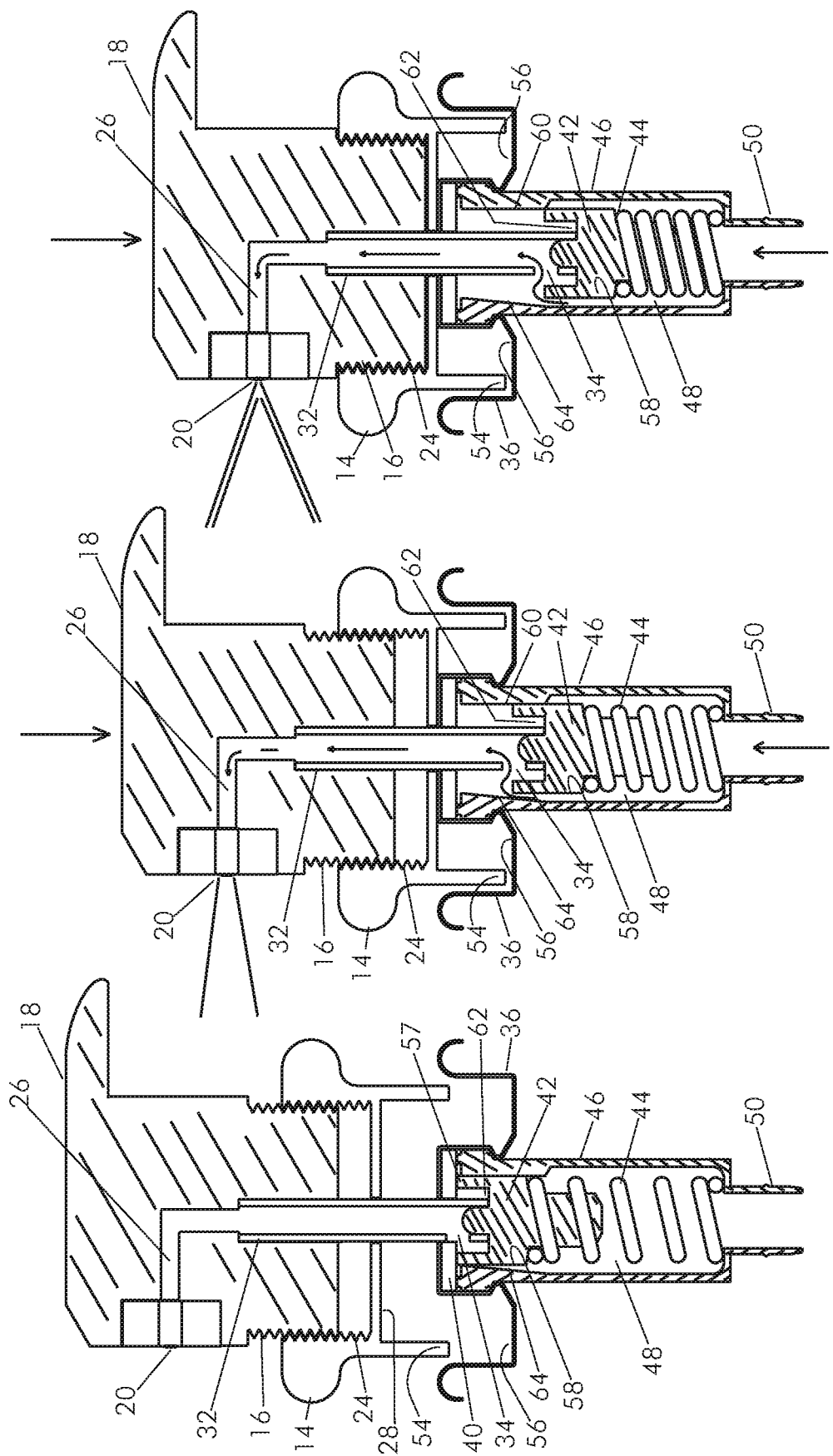

AEROSOL VALVE

CROSS-REFERENCES TO RELATED APPLICATIONS

None.

STATEMENT REGARDING FEDERAL SPONSORED RESEARCH OR DEVELOPMENT

None.

NAMES OF PARTIES TO A JOINT RESEARCH AGREEMENT

None.

REFERENCE TO A "SEQUENCE LISTING", A TABLE, OR A COMPUTER PROGRAM LISTING APPENDIX SUBMITTED ON COMPACT DISC AND INCORPORATION-BY-REFERENCE OF THE MATERIAL ON THE COMPACT DISCLOSURE

None.

STATEMENT REGARDING PRIOR DISCLOSURES BY AN INVENTOR OR JOINT INVENTOR

None.

BACKGROUND OF THE INVENTION

1. Field of the Invention

The present invention relates to aerosol spray can valves, and more particularly, to an improved valve to precisely control the flow of dispensed liquids.

2. Description of Related Art Including Information Disclosed Under 37 CFR 1.97 and 37 CFR 1.98

Several designs for spray valves have been designed in the past. None of them, however, includes a tapered seat with mating tapered gate surface that progressively increases the size of the escape path of the fluid dispensed and allows a user to adjust the depth stop of the cap/trigger to limit the volume and rate of fluid dispensed.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

BRIEF SUMMARY OF THE INVENTION

It is one of the main objects of the present invention to provide an aerosol valve that is easy to control the flow of the fluid being dispensed.

It is another object of this invention to provide an aerosol valve that has a stop limit for pressing the valve button that can be adjusted without tools.

It is still another object of the present invention to provide an aerosol valve that has an indexing notch and valve body that is adapted to work well with a can handle accessory.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE SEVERAL VIEWS OF THE DRAWING

With the above and other related objects in view, the invention consists in the details of construction and combination of parts as will be more fully understood from the following description, when read in conjunction with the accompanying drawings in which:

FIGS. 8A-8C show an elevation section view of an aerosol valve assembly through several modes of operation.

DETAILED DESCRIPTION OF THE INVENTION

Figure 1:
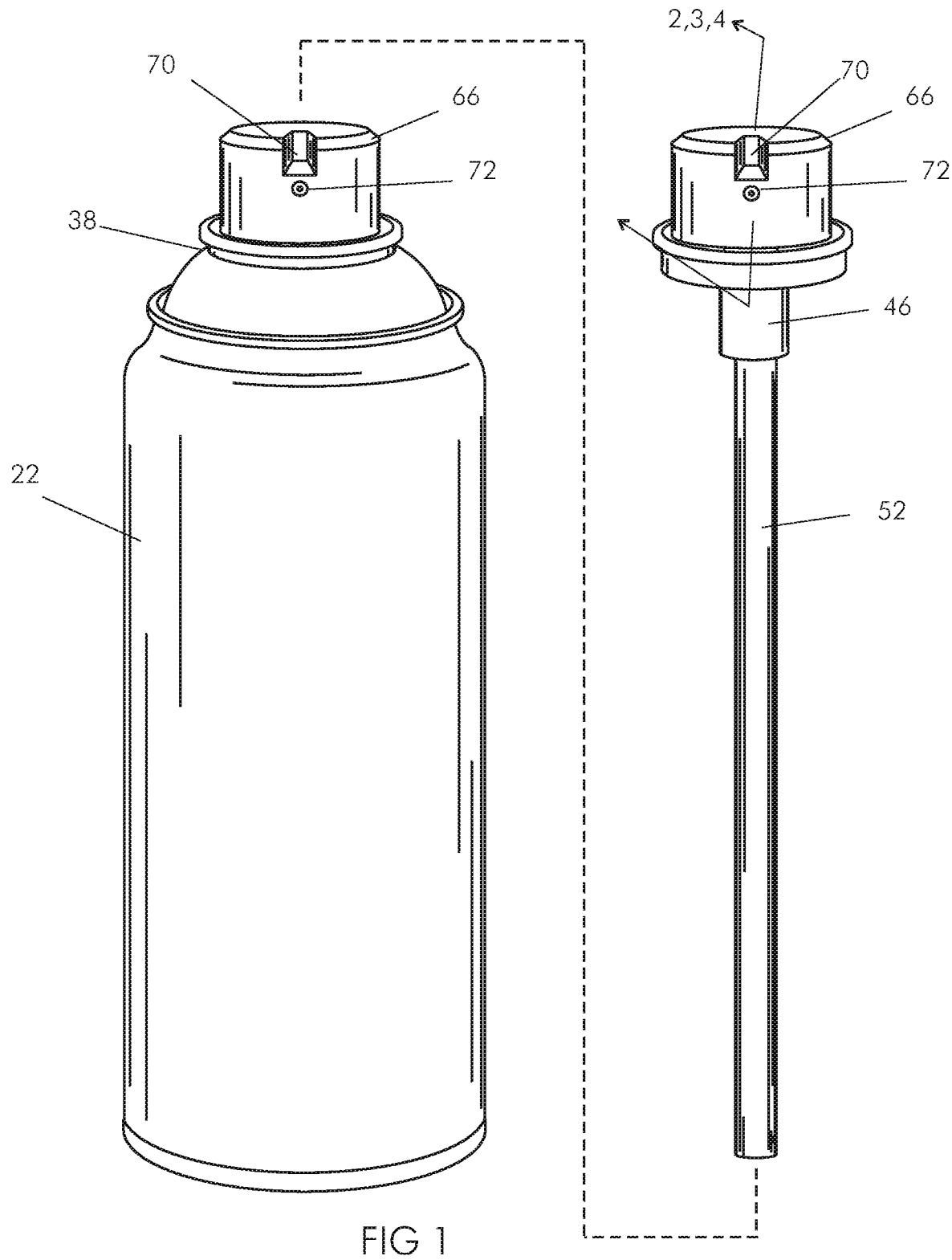
FIG. 1 shows a perspective view of aerosol can assembly.

While this invention may be embodied in many different forms, there are described in detail herein specific embodiments of the invention. This description is an exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the spray can, the aerosol can, the spray valve, the aerosol valve, the nozzle, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, where the present invention is generally referred to with numeral 10, it can be observed that it basically includes, among other shown and described elements: a cap 12, a collar 14, threads 16, a surface 18, an aperture 20, a can 22, threads 24, a port 26, a base 28, an aperture 30, a tube 32, an aperture 34, a ring 36, a neck 38, a washer 40, a gate 42, a spring 44, a body 46, a cavity 48, a stem 50, a tube 52, a foot 54, a base 56, an edge 57, a face 58, a seat 60, a seat 62, a channel 64, a foot 65, a cap 66, a port 68, a notch 70 and an aperture 72.

The can 22 contains a pressurized fluid that will ultimately be dispensed as a spray through the aperture 72. Typically, fluids such as paints, lubricants, adhesives, duster or other liquids and gasses are dispensed with the present device and other aerosol cans.

Looking at FIG. 1, the spray assembly is inserted into the can 22 and another copy of the spray assembly is positioned adjacent to the can 22 for illustration. The hollow tube 52 reaches to the bottom interior of the can 22 to pick up the fluid contained in the can 22. The tube 52 connects to the body 46 to deliver the fluid in the can 22 through the cap 66 and out through the aperture 72.

Generally, the spray assembly is permanently attached to the neck 38 of the can 22 during the manufacturing process after the can 22 is filled with the fluid to be dispensed. A notch 70 is provided on the cap 66 to index the location of the aperture 72. This is particularly useful when the device is used with a spray gun handle instead of directly depressing the cap 66 with the user's finger. The spray gun handle may have a tab that fits into the notch 70 to register the aperture 72.

Figure 2:
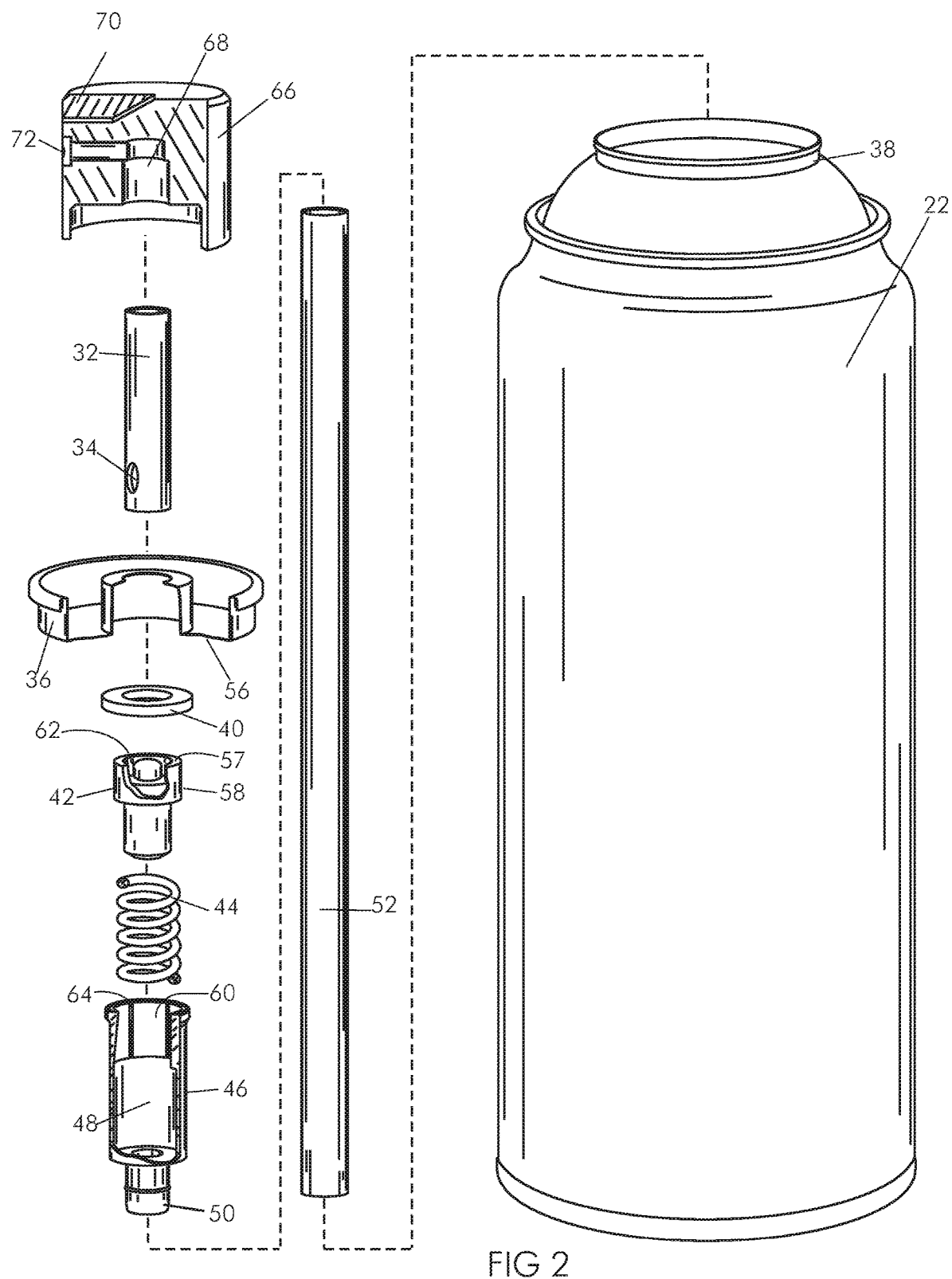
FIG. 2 shows an exploded, partial cross section, perspective view of an aerosol can assembly.

Looking now at FIG. 2, the spray assembly is disassembled to show the configuration of interior parts. Generally, the top of the tube 52 is friction fit onto the stem 50 of the body 46. The cavity 48 contains a spring 44. The gate 42 is inserted into the spring 44. The spring 44 thereby biases the gate 42 and an upward position closing the valve. When the gate 42 is in an upward position the edge 57 is in direct contact with the washer 40 sealing the valve, the washer 40 is optionally present between the gate 42 and the ring 36. The tube 32 passes through the center of the ring 36 and the center of the washer 40 connecting to the seat 62. The aperture 34 of the tube 32 is below the ring 36. The top of the tube 32 connects to the port 68 on the cap 66.

When the fluid is dispensed, fluid in the bottom of the can 22 is picked up through the bottom of the tube 52 and under pressure transmitted through the stem into the cavity 48 of the body 46. When the cap 66 is depressed the tube 32 presses against the face 58 of the gate 42, in turn compressing the spring 44 to separate the edge 57 from the washer 40 allowing the fluid being dispensed to flow past the gate 42, into the tube 32, through the port 68 and be dispensed through aperture 72.

Figure 3:
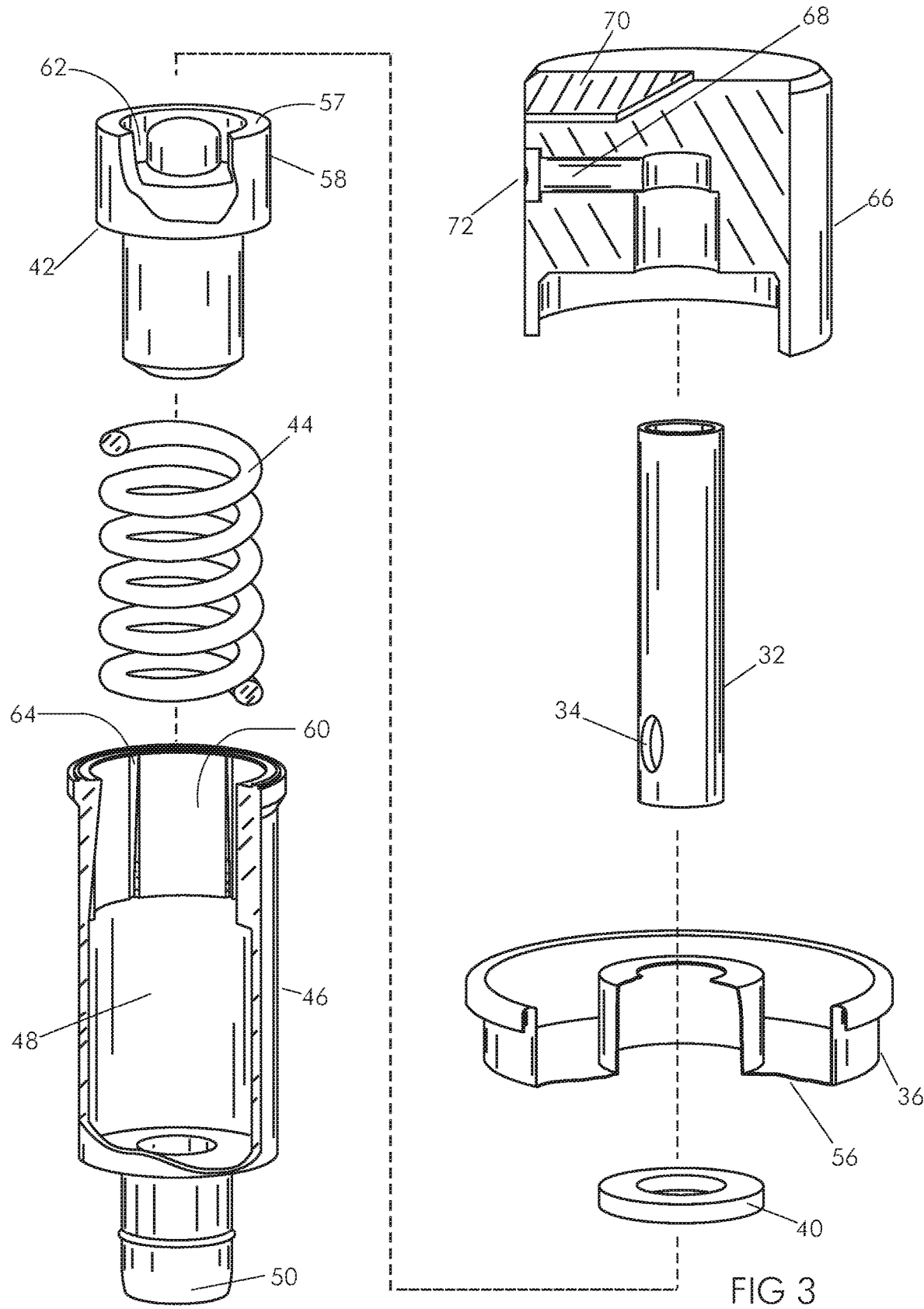
FIG. 3 shows an exploded, partial cross section, perspective view of an aerosol valve assembly.

Looking now in FIG. 3, a detailed view of the valve assembly is shown. In the normal condition of the valve assembly the gate 42 is contained inside the body 46 where the spring 44 biases gate 42 in an upward position so that the edge 57 is in complete contact with the washer 40 preventing any dispensation of fluid. As the top of the cap 66 is depressed, the tube 32 presses down on the seat 62 of the gate 42 causing the spring 44 to compress in the face 58 slides down along gate 60 allowing the channel 64 to open in fluid communication between the interior of the cavity 48 and into the aperture 34 of the tube 32 where the fluid is ultimately delivered to the aperture 72 through port 68.

Figure 4:
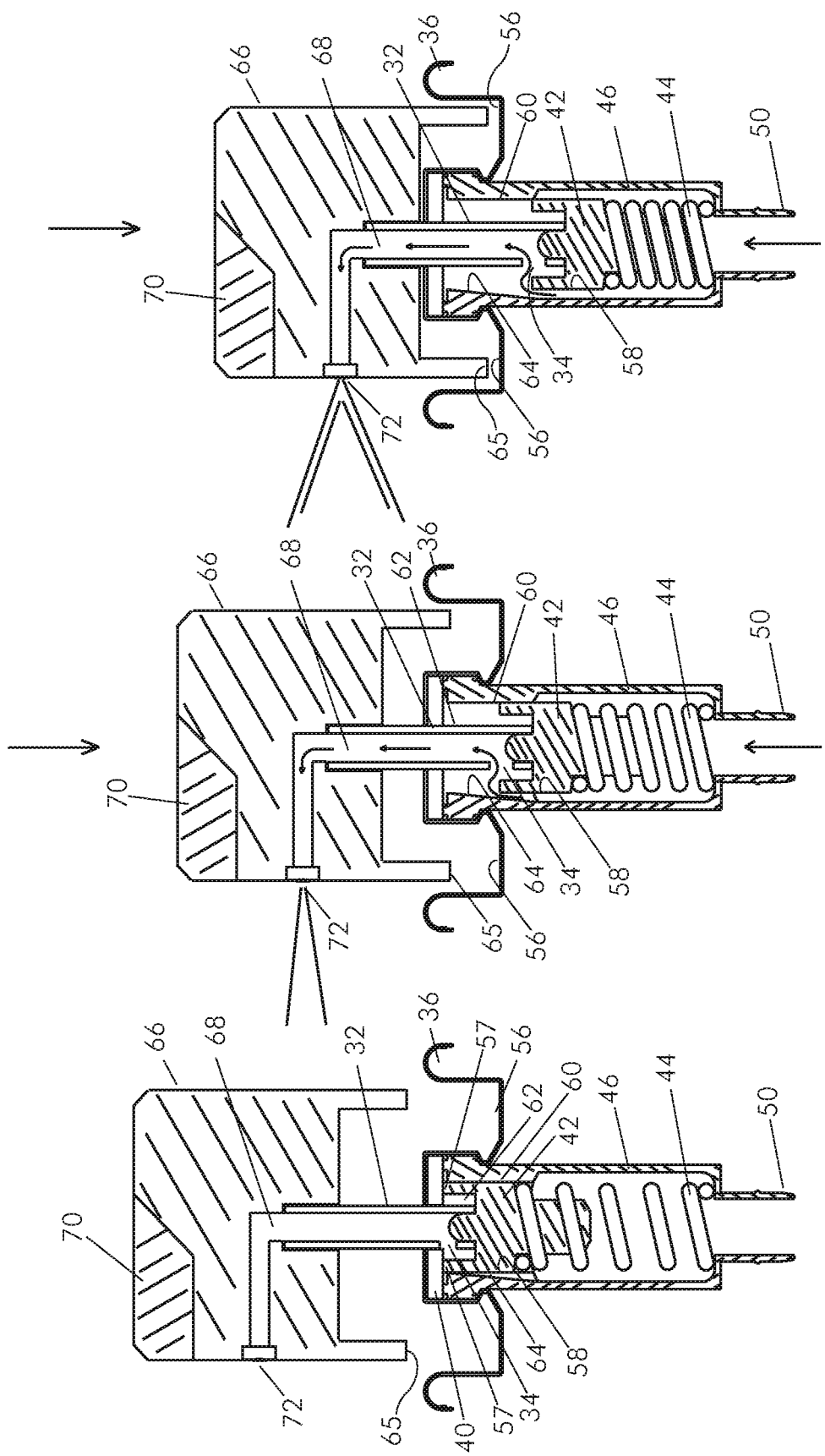
FIGS. 4A-4C show an elevation section view of an aerosol valve assembly through several modes of operation.
Figure 5:
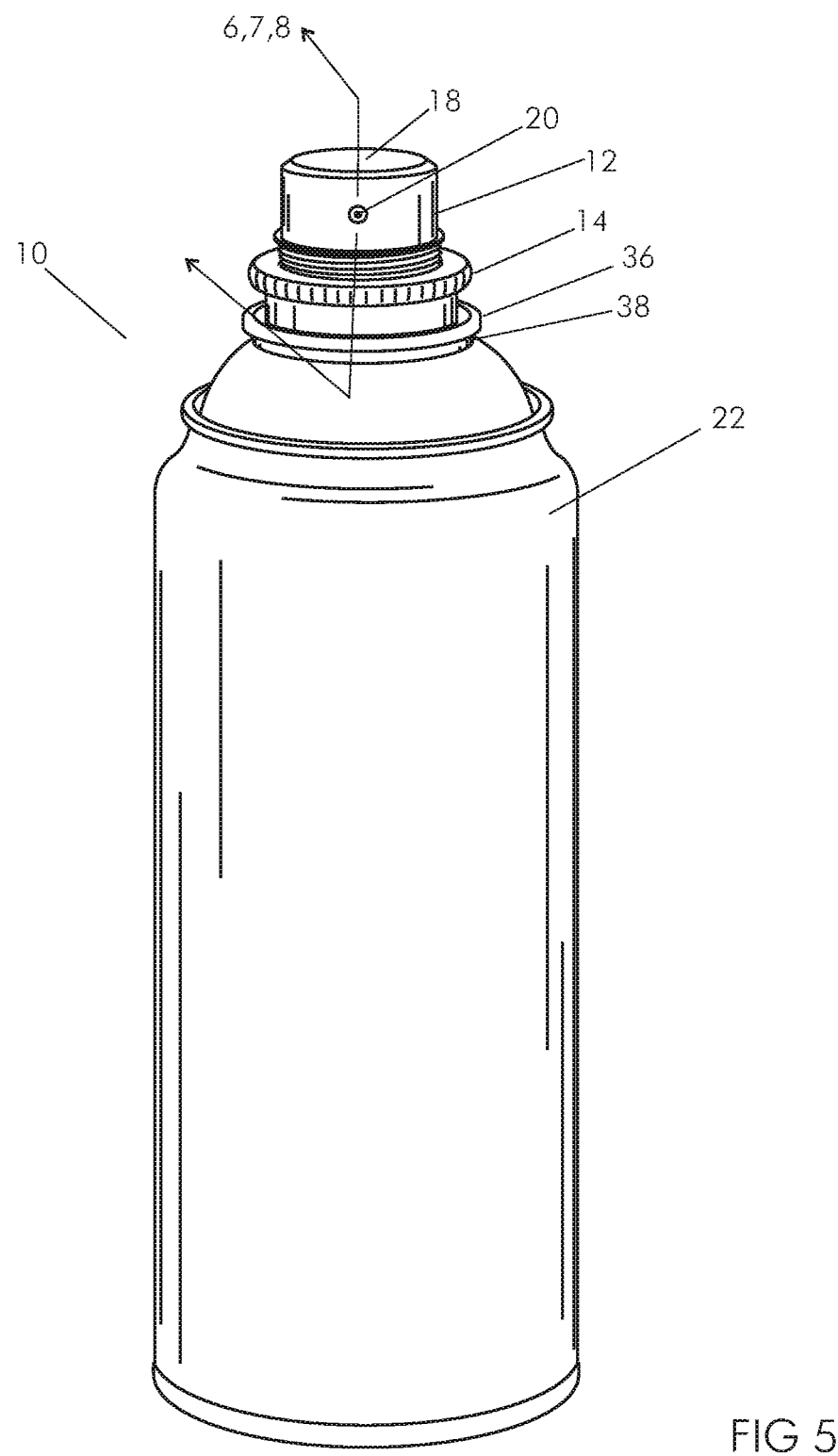
FIG. 5 shows a perspective view of an aerosol can assembly.

FIGS. 4A, 4B and 4C show the spray assembly in its various modes of operation. FIG. 4A shows the valve and a closed position where the spring 44 is fully extended pressing the edge 57 against the washer 40 preventing any fluid flow into the tube 32. FIG. 4B shows the cap 66 partially depressed where the spray assembly is dispensing a low level of fluid. FIG. 4C shows the cap 66 fully depressed allowing the maximum rate of fluid to flow through the valve assembly and out through the aperture 72.

In FIG. 4B, arrows of fluid flow are shown between the seat 60 and gate 42. Note also the distance between the foot 65 and base 56 are also reduced when the cap 66 is partially depressed. The tapered nature of the interface between the channels 64 and the gate 42 allows for limited fluid past the gate 42. As the cap 66 is further depressed as shown in FIG. 4C to the maximum amount where the foot 65 contacts the base 56 the opening between the channels 64 and the gate 42 is substantially greater than that shown in FIG. 4B. By progressively enlarging the gap between the channels 64 in the gate 42 the flow of fluid into the tube 32 through the aperture 34 and out through aperture 72 is exponentially increased.

Looking now at FIGS. 5 through 8A-C, optional additional elements are also shown and described. An important distinction shown in these figures is embodied by the addition of a collar 14 with threads 24 that engage in thread 16 of the cap 12. The cap 12 can be rotated relative to the collar 14 to adjust the length of the tube 32 that protrudes beneath the base 28 of the collar 14.

By unthreading the threads 16 from the threads 24 more of the tube 32 is retracted inside of the cap 12. This in turn reduces the length of the tube 32 that may be used to press onto the seat 62 and thereby reduces the distance that the gate 42 can be pressed into the cavity 48 to separate the face 58 of the gate 42 from the channels 64 to limit the flow of fluid through the valve assembly.

Conversely, by threading the threads 16 deeper into the threads 24 of the collar 14 the length of the tube 32 extending below the base 28 is extended thereby allowing the bottom of the tube 32 to press against the seat 62 of the gate 42 deeper into the body 46 thereby opening the space between the channel 64 and the face 58 more to increase the flow of fluid dispensed.

The washer 40 is provided to act as a guide for the tube 32 to be directed over the seat 62 of the gate 42 and seal the ring 36 with the body 46 when the valve is in the closed position. Similar to the versions described above, the cap 12 is depressed at its maximum level when the foot 54 bottoms out into the base 56 of the ring 36. The cap 12 may optionally also include a notch, similar to the notch 70 shown in FIG. 1. The tube 52 is hollow and at a bottom end is held near the bottom interior of the can 22. The top of the tube 52 is attached to the body 46 at the stem 50. The washer 40 is generally made from a supple material to create a seal, such as rubber, cork or soft plastic.

Figure 6:
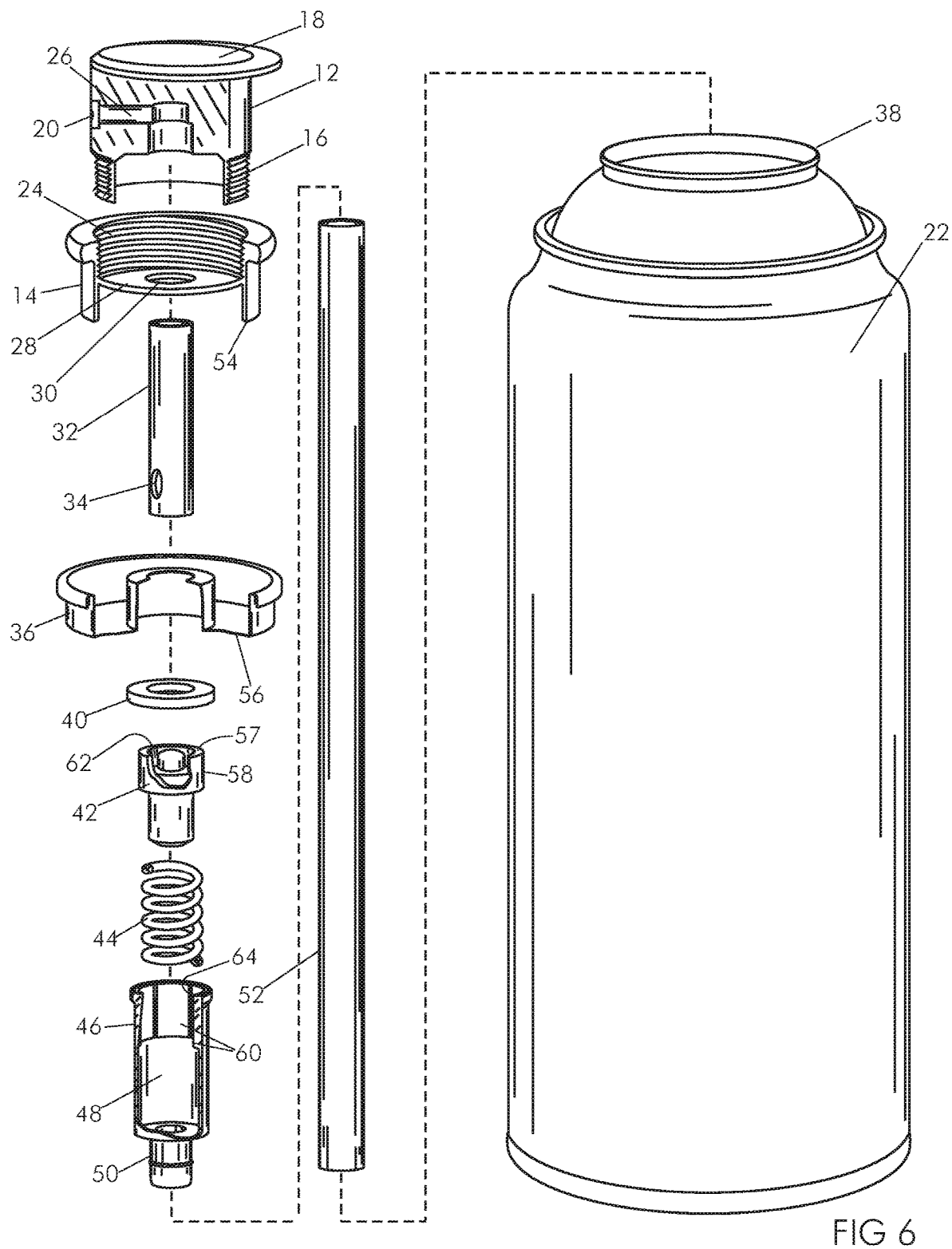
FIG. 6 shows an exploded, partial cross section, perspective view of an aerosol can assembly.
Figure 7:
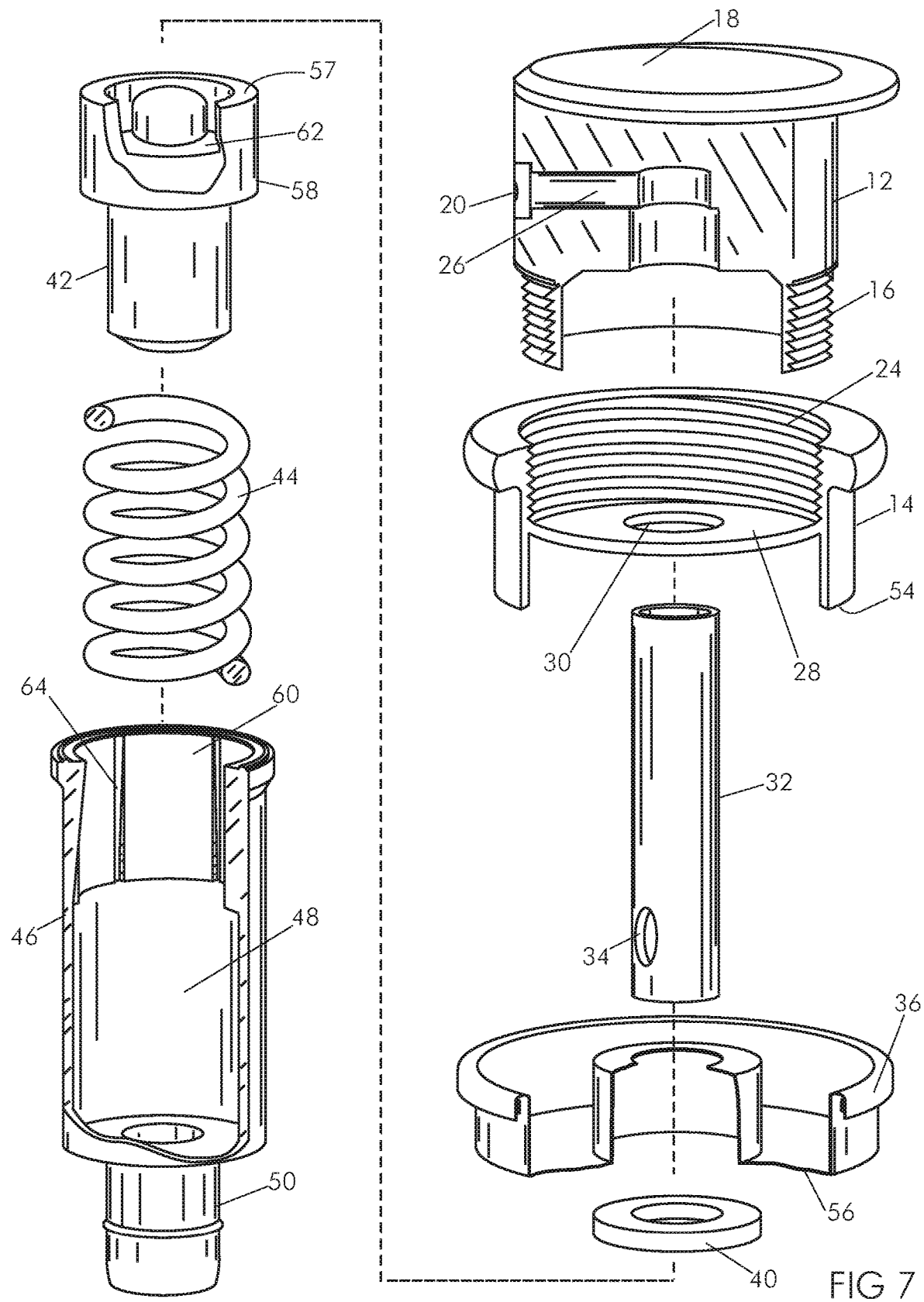
FIG. 7 shows an exploded, partial cross section, perspective view of an aerosol valve assembly.

Looking at FIGS. 6 and 7, the valve assembly is shown in more detail. The fluid dispensed from the can is picked up from the bottom of tube 52, travels through the tube 52 into the cavity 48 of the body 46. When the spring 44 is extended the edge 57 of the washer 40 is sealed tight against the seat 60 preventing escape of the fluid to be dispensed. As the cap 12 is depressed the tube 32 affixed into the bottom side of the cap 12 is forced through the center of the washer 40 against the seat 62 of the gate 42 thereby depressing the spring 44 and separating the edge 57 from the washer 40 allowing the fluid to pass through the body 46, enter the aperture 34 of the tube 32, flow through the port 26 and out the aperture 20 into a spray towards the substrate.

Without tools, the user of the device can rotate the cap 12 to increase or decrease the threaded engagement of the threads 16 with the threads 24. Minute adjustments of the volume of spray able to be passed through the spray valve assembly are easily performed. The cap 12 may also be completely unthreaded to separate the cap 12 from the collar 14 for cleaning, storage or other maintenance.

The channels 64 are optionally provided in the surface of the seat 60 allow the flow of fluid through the cavity 48 in greater volume than would be available if the seat 60 walls were smooth. At the uppermost side of the seat 60 the channels 64 merge with the surface of the seat 60 to a minimum when the cap 12 is not depressed and the spring is extended while the device is in a resting mode.

Looking at FIGS. 8A-8C the examples of the operational modes are shown. In FIG. 8A the spring 44 is fully extended and the valve is closed. The edge 57 of the gate 42 can be seen to tightly connect with the washer 40 of the gate 42. In this configuration no fluid contained in the can 22 will pass through the body 46 to be dispensed.

In FIG. 8B, the aerosol valve is partially open. Note that the foot 54 is in contact with the base 56 indicating that the surface 18 has been fully depressed to maximize the available flow of fluid through the valve. Note also that the threads 16 are partially engaged into the threads 24. Essentially, this withdraws part of the tube 32 into the collar 14 preventing the tube 32 from pressing further onto the seat 62 of the gate 42. In this configuration the user pressing harder onto surface 18 will not cause the valve assembly to spray a greater volume of fluid.

In FIG. 8C notice that the threads 16 are fully engaged in to threads 24. This causes the tube 32 to protrude further below the bottom of the ring 36. This, in turn, allows the tube 32 to press the gate 42 further into the body 46 against the Spring 44. This opens the space between the channels 64 and face 58 allowing the maximum flow of fluid capable through this valve configuration.

In the version of the spray valve shown in FIGS. 8A through 8C, the distance the tube 32 extends lower than the base 56 is adjustable without tools by rotating the collar 14 with the fingers to engage the threads 16 onto threads 24 to a greater or lesser degree. When the foot 54 of the collar 14 bottoms out into the base 56 of the ring 36 the valve body cannot be opened further without unthreading thread 16 from thread 24.

An important version of the invention can be fairly described as being an aerosol valve comprising, among other elements, a cap 66, a tube 32, a gate 42, a spring 44, a body 46 and a pickup tube 52. The cap 66 has an internal port 68 that on a first end terminates at an aperture 72 and on a bottom end connects with the tube 32 so that an interior of the tube is in fluid communication with the aperture 72. In other words, a fluid passing up through the tube 32 will flow through the port in the cap 66 and spray out through the aperture 72. The gate 42 and the spring 44 are contained within a cavity 48 inside the body 46. Entirely around an upper exterior circumference of the gate 42 is a seat 62. Entirely around an upper interior circumference of the cavity 48 is a washer 40. The face 58 mating with the seat 60 seal the aerosol valve closed. The spring 44 biases the seat 62 towards the upper edge of the cavity 48 so that the seat 62 and the washer 40 form an impermeable seal. The tube 32 passes through a ring 36 that seals a top of a can 22. A top edge of the body 46 is affixed to the ring 36 inside the can 22. The pickup tube 52 is affixed to a bottom end of the body 46 and extends to a bottom interior of the can 22. When the cap 66 is pressed the tube 32 presses against the top of the gate 42 against the bias of the spring 44 causing the seat 62 to separate from washer 40 causing a fluid inside the can 22 to be forced up the pickup tube 52 then through the body 46 past the seat 62 then into the tube 32 then through the port 68 and then out through the aperture 72 when the fluid in the can 22 is emitted as a spray.

Optionally, the interior surface of the body 46 includes vertical channels 64 to control the rate that fluid can pass through the aerosol valve. Optionally, the cap includes an indexing notch 70 to orient the aperture 72 in a preselected direction. This feature is useful when the can is used with a mechanical spray gun grip and trigger. Optionally and as shown in FIG. 6, a bottom side of the cap 12 includes a collar 14 that adjusts relative to the cap 12 to extend or retract a length of the tube 32 that protrudes below the cap 12 thereby adjusting a length that the tube 12 can push the seat 62 away from the washer 40 to limit a maximum rate of fluid dispensed through the aerosol valve.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

We claim:

1. An aerosol valve comprising a cap, a valve tube, a gate, a spring, a body and a pickup tube;
   the cap has an internal port that on a first end terminates at an aperture and on a bottom end connects with the valve tube so that an interior of the valve tube is in fluid communication with the aperture;
   the gate and the spring are contained within a cavity inside the body;
   entirely around an upper circumference of the gate is a seat;
   entirely around an upper circumference of the cavity is a washer;
   the spring biases the seat towards the upper edge of the cavity so that the seat and the washer form an impermeable seal;
   the valve tube passes through a ring that seals a top of a can;
   an inner surface of the body has a plurality of parallel channels that taper until an upper end of the inner surface;
   a top edge of the body is affixed to the ring inside the can;
   the pickup tube is affixed to a bottom end of the body and extends to a bottom interior of the can;
   when the cap is pressed the valve tube presses against the gate against the bias of the spring causing the seat to separate from washer causing a fluid inside the can to be forced up the pickup tube then through the body passing through the channels and past the seat then into the valve tube then through the port and then out through the aperture.

2. The aerosol valve of claim 1 further characterized in that the cap includes an indexing notch to orient the aperture in a preselected direction.

3. The aerosol valve of claim 1 further characterized in that a bottom side of the cap connects to a collar that adjusts relative to the cap to extend or retract a length of the valve tube that protrudes below the collar thereby adjusting a length that the valve tube can push the seat away from the washer to limit a maximum rate of fluid dispensed through the aerosol valve.

* * * * *